Patented Dec. 29, 1953

2,664,444

UNITED STATES PATENT OFFICE 2,664,444

N-(n-DODECYL) - N - (3,4 - DICHLOROPHEN-ETHYL) - N,N - DIMETHYL - AMMONIUM COMPOUNDS

Charles Edward Kwartler, Albany, N. Y., assignor to Winthrop-Stearns Inc., New York, N. Y., a corporation of Delaware No Drawing. Application November 20, 1951,
Serial No. 257,425

3 Claims. (Cl. 260—567.6)

This invention relates to N-(n-dodecyl)-N-(3,4-dichlorophenethyl) - N,N - dimethylammonium salts having the formula

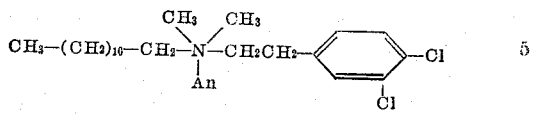

where An is the anion of a strong organic or inorganic acid; and to the preparation of the same. The anion, An, in the above formula for my new compounds can be, for example, the anion of a hydrohalic acid such as hydrochloric acid or hydrobromic acid, p-toluenesulfonic acid, methyl hydrogen sulfate, methanesulfonic acid, ethanesulfonic acid, and the like.

My new compounds exhibit high antifungal activity and are also useful as antibacterial agents.

The compounds of my invention can in many instances be most conveniently obtained by treating N,N-dimethyl-3,4 - dichlorophenethylamine with an ester having the formula (n-dodecyl)-An. This reaction is represented by the following equation:

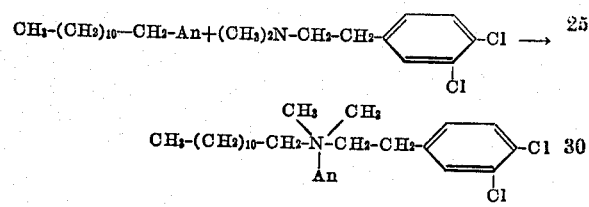

This procedure is suitable, for example, where An is Cl—, Br—, CH₃—SO₃—, C₂H₅—SO₃— and p—CH₃C₆H₄—SO₃—. This reaction is advantageously carried out by heating approximately equimolecular proportions of the two reactants together at about 40–225° C. in an organic solvent and then isolating the desired product by cooling the reaction mixture and collecting the product which separates from solution.

When An is CH₃—SO₄—, i. e. when it is desired to prepare N-(n-dodecyl)-N-(3,4-dichlorophenethyl)-N,N-dimethylammonium methosulfate, I prefer to treat N-methyl-N-(n-dodecyl)-3,4-dichlorophenethylamine with methyl sulfate. This reaction proceeds in accordance with the following equation:

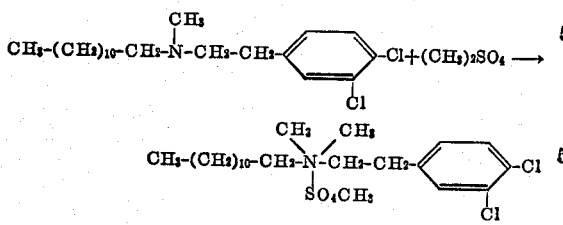

My invention is illustrated by the following examples without, however, being limited thereto.

EXAMPLE 1

*N-(n-dodecyl)-N-(3,4-dichlorophenethyl)-N,N-dimethylammonium bromide*

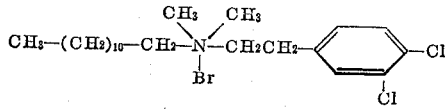

10.0 g. of N,N-dimethyl-3,4-dichlorophenethylamine and 11.4 g. of n-dodecyl bromide were dissolved in 150 ml. of acetone and the solution thus obtained was boiled under reflux for four hours. The reaction mixture was then cooled to 0° C. The crystalline product which separated from the solution was collected on a filter, washed with 20 ml. of cold acetone and then with 50 ml. of anhydrous ether, and then dried in a vacuum desiccator over phosphorus pentoxide. There was thus obtained 20 g. of N-(n-dodecyl)-N-(3,4-dichlorophenethyl) - N,N-dimethylammonium bromide which melted at 159–162° C.

EXAMPLE 2

*N-(n-dodecyl)-N-(3,4-dichlorophenethyl)-N,N-dimethylammonium chloride*

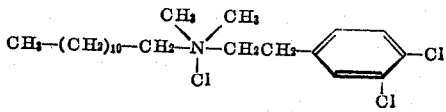

When N,N-dimethyl-3,4 - dichlorophenethylamine is heated with n-dodecyl chloride in benzyl alcohol solution in a manner analogous to the procedure described above in Example 1, there is obtained N-(n-dodecyl)-N-(3,4-dichlorophenethyl)-N,N - dimethylammonium chloride.

I claim:

1. A compound having the formula

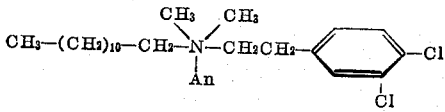

where An is the anion of a strong acid.
2. N-(n-dodecyl)-N-(3,4 - dichlorophenethyl)-N,N-dimethylammonium bromide.
3. N-(n-dodecyl)-N-(3,4 - dichlorophenethyl)-N,N-dimethylammonium chloride.

CHARLES EDWARD KWARTLER.

References Cited in the file of this patent

UNITED STATES PATENTS

| Number | Name | Date |
|---|---|---|
| 2,108,765 | Domagk | Feb. 15, 1938 |

FOREIGN PATENTS

| Number | Country | Date |
|---|---|---|
| 458,033 | Great Britain | Dec. 8, 1936 |
| 806,662 | France | Sept. 28, 1936 |